Patented Jan. 4, 1927.

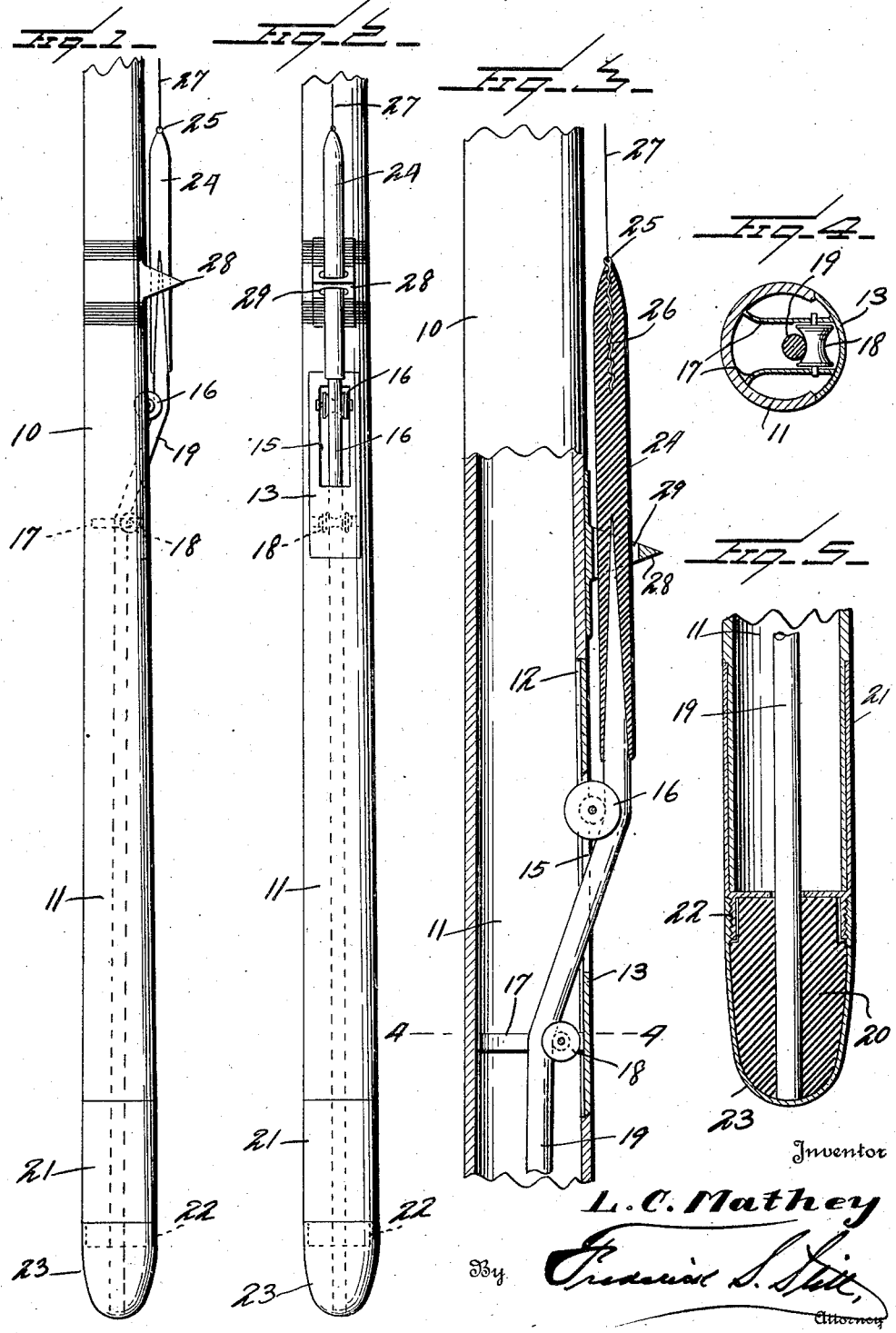

1,613,522

UNITED STATES PATENT OFFICE.

LOUIS C. MATHEY, OF NASHVILLE, TENNESSEE.

STRAIN-APPLYING DEVICE FOR FISHING RODS.

Application filed June 29, 1926. Serial No. 119,451.

This invention relates to certain improvements on the strain applying devices for fishing rods embodied in my pending application Serial No. 116,627, filed June 17, 1926.

In this application there was illustrated a strain applying device for fishing rods comprising a length of elastic band attached at its rear end to the butt of a fishing rod and at its forward end to a line so that as strain was applied to the line by a fish, the elastic band would expand and thus exert a constant pulling strain upon the fish, keeping the line taut at all times.

The general object of the present invention is to provide means whereby the elastic element may be disposed entirely within the fishing rod, that is within the butt thereof instead of being applied to the exterior of the fishing rod as in my pending application, and provide means whereby the elastic element may be detachably engaged with the butt of the rod.

A further object is to so support the elastic element that the thumb of the fisherman may be applied to it at any time to limit its further expansion, thus permitting the more easy landing of a fish than would otherwise be possible and the convenient handling of the rod and line.

Other objects will appear in the course of the following description.

My invention is illustrated in the accompanying drawings wherein:—

Figure 1 is an elevation of a fishing rod with my attachment applied thereto;

Fig. 2 is an elevation taken at right angles to Figure 1;

Fig. 3 is an enlarged section of the butt, the butt being partly in section and the header being shown in section;

Fig. 4 is a section on the line 4—4 of Figure 3;

Fig. 5 is an enlarged fragmentary sectional view of the butt.

Referring to these drawings 10 designates a fishing pole of any suitable construction and having the butt 11. It will be understood that the fishing pole shown is purely illustrative and it may have any desired detail. The butt 11 as illustrated in Figure 3, is hollow and formed with a longitudinally extending slot 12, disposed over which slot is the plate 13 which may be of metal or any suitable material, this plate in turn being formed with a longitudinally extending slot 15. It will be seen from Figure 3 that the plate 13 has undercut ends and is solidly fitted in the butt and supported against accidental movement.

Mounted in the slot of the plate 13 is a grooved roller 16 and disposed within the butt rearward of the slot 15 and beneath the plate 13 is a yoke 17 carrying a grooved roller 18 as shown in Figure 4. Passing over the roller 16 and under the roller 18 is an elastic band or element 19 which is preferably circular in cross section and its rear end is rigidly connected to an anchoring block 20 which may be made of hard rubber or any other suitable material of this character. The rear end of the butt 11 is provided with a ferrule 21 of metal which has an exteriorly screw-threaded flange 22. The block 20 is reduced in diameter at its forward end to fit within this flange 22 and the block or anchor is held in place by a cap 23 of metal which has screw-threaded engagement with the screw-threaded flange 22.

The forward end of the elastic element 19 engages a rod-like member 24 which I have termed a header and which may be made of metal, hard rubber or other suitable material, this header being cleft from its rear edge forward and the elastic element 19 being tapered at its forward end and inserted in said cleft and vulcanized, riveted, cemented or otherwise firmly attached thereto. An eye 25 is attached to the forward pointed end of the header, this eye being shown with a corrugated shank 26 embedded in the header. A fishing line 27 is attached to this eye.

Mounted upon the butt forward of the plate 13 is a guide 28 illustrated as approximately triangular in cross section and having an opening 29 through which the header 24 passes. It will be understood that this member 28 acts as a guide not only for the header but for the rubber element 19 when the latter is expanded.

In the use of this device, assuming that a fish has struck, the line will be drawn outward under the strain and this will cause the elastic element 19 to expand, the expansion depending upon the strength or cross sectional area of the band 19, the length thereof, and the pounds of pull exerted by the fish. It is intended that the band 19 shall expand under pull to a very considerable degree but that when the strain is relieved the elastic band shall contract to approximately the position shown in Figures 1, 2 and 3. Of course, it will be understood as illustrated in my prior application, that the rod will be provided with guides along its length through which the header 24 and the elastic band 19 may pass as the elastic band is expanded.

One of the principal objects of the present construction is that the fisherman by pressure of his thumb or finger upon the elastic element 19, at the pulley 16 for instance, may stop any further expansion of the elastic element or prevent the elastic element from expanding practically at all. Thus, if it is desired that the elastic element shall work freely, no pressure is exerted upon the elastic element, but if at any time it be desired to put a strong pull upon the fish as contradistinguished from a yielding pull, the fisherman may press against the elastic element at any place forward of or at the pulley 16 and stop the further expansion of the elastic element. This is particularly valuable where the fish has become so weak through his struggles that the elastic band has contracted nearly to its full extent and it is desired to land the fish.

It will be seen that by providing an anchoring member 20 disposed within the butt and held in place by the cap 23, it is an easy matter to at any time remove and replace the elastic band and an easy matter to retain the elastic element entirely within the butt when the rod is disjointed and then the elastic band may be readily pulled out through the slot 15 and guided over the pulley 16 and attached to a line. It is to be noted that the yoke 17 consists of two lateral members which are laterally bent at their ends remote from the pulley 18, these lateral members acting as guides preventing the elastic member, when it is slack, from getting to one side of the pulley so that when strain is applied thereto the elastic member will not bear against the pulley 18. I design that the elastic member shall be made in different weights and coefficients of elasticity so that one elastic member may be interchanged for another depending upon the fish which it is designed to be caught. This interchange is readily accomplished by taking off the cap 23 and removing the anchoring member 20 with this elastic member 19 through the aperture in the ferrule. A new or different elastic member may then be easily put in place, threaded over the pulleys 16 and 18 and through the guide 28. It is reiterated that I do not wish to be limited to any particular form of rod or butt and that the device may be modified in many ways without departing from the spirit of the invention as defined in the appended claims.

I claim:—

1. The combination with a fishing rod having a hollow portion, of an elastic member having one end disposed within the hollow portion of the rod and anchored thereto, the other end extending upon the exterior of the fishing rod, and a pulley guiding the elastic member to the outer surface of the fishing rod, the elastic member having means on one end whereby it may be connected to a fishing line.

2. The combination with a fishing rod having a hollow portion, of an elastic member having one end disposed within the hollow portion of the rod and anchored thereto, the other end extending upon the exterior of the fishing rod, a pulley guiding the elastic member to the outer surface of the fishing rod, the elastic member having attached to its free end a header of hard material and to which the fishing line may be attached, the forward extremity of the header being pointed.

3. The combination with a fishing rod having a hollow portion, of an elastic member having one end disposed within the hollow portion of the rod and anchored thereto, the other end extending upon the exterior of the fishing rod, a pulley guiding the elastic member to the outer surface of the fishing rod, the elastic member having attached to its free end a header of hard material and to which the fishing line may be attached, the header being longitudinally cleft and the free end of the elastic element being inserted in and rigidly secured to said cleft portion of the header.

4. The combination with a fishing rod having a hollow portion, of an elastic element anchored at one end within the hollow portion of the rod, the wall of the hollow portion being slotted and there being a pulley disposed adjacent said slot over which the elastic element passes, and a rigid member attached to the free extremity of the elastic member and adapted to be connected to a fishing line.

5. The combination with a fishing rod having a hollow portion, of an elastic member having one end disposed within the hollow portion, an anchor detachably engaged with the hollow portion of the rod and with which anchoring member the elastic member is engaged, the wall of the hollow portion having a slot through which the elastic member passes, a pulley mounted in said slot and over which the elastic member passes, and a rigid member firmly attached to the free end of the elastic member and constituting means for the attachment of a fishing line.

6. The combination with a fishing rod having a hollow butt, of an anchoring member detachably engaged with the end of the butt, an elastic member rigidly engaged with said anchoring member and extending longitudinally through the butt, the butt having a longitudinally extending slot through which the elastic member passes, a pulley disposed within the butt rearward of said slot, a pulley disposed in said slot adjacent the forward end thereof, the elastic member passing beneath the first named pulley and over the second named pulley, and means for connecting a fishing line to the free end of the elastic member.

7. The combination with a fishing rod having a hollow butt, of an anchoring member detachably engaged with the end of the butt, an elastic member rigidly engaged with said anchoring member and extending longitudinally through the butt, the butt having a longitudinally extending slot through which the elastic member passes, a pulley disposed within the butt rearward of said slot, a pulley disposed within said slot adjacent the forward end thereof, the elastic member passing beneath the first named pulley and over the second named pulley, and a header of rigid material rigidly engaged at its rear end with the free end of the elastic member, the forward end of the header being pointed and having an eye for the attachment of a fishing line.

8. The combination with a fishing rod having a hollow butt and a ferrule mounted upon the butt and exteriorly screw-threaded, of an anchoring member fitting against the end of the butt, a cap fitting over the anchoring member and engaging the ferrule, an elastic member attached to the anchoring member, the hollow butt being slotted to permit the emergence of the elastic member, guide pulleys over which the elastic member passes to the exterior of the butt, and means for connecting the elastic member to a fishing line.

9. The combination with a fishing rod having a hollow portion, of an elastic member having one end disposed within the hollow portion of the rod and anchored thereto, and the other end extending through the hollow portion and out upon the exterior of the rod, said elastic member having means on its free end whereby it may be connected to a fishing line.

In testimony whereof I affix my signature.

LOUIS C. MATHEY.